(12) United States Patent
Suzuki et al.

(10) Patent No.: US 6,540,824 B1
(45) Date of Patent: Apr. 1, 2003

(54) TITANIUM-IRON BASED COMPOSITE OXIDE PIGMENT AND METHOD FOR PRODUCTION THEREOF

(75) Inventors: Takayuki Suzuki, Osaka (JP); Koji Kataoka, Osaka (JP)

(73) Assignee: Ferro Enamels (Japan) Limited, Osaka (JP)

( * ) Notice: Subject to any disclaimer, the term of this patent is extended or adjusted under 35 U.S.C. 154(b) by 0 days.

(21) Appl. No.: 09/926,577

(22) PCT Filed: Mar. 21, 2001

(86) PCT No.: PCT/JP01/02228

§ 371 (c)(1),
(2), (4) Date: Feb. 7, 2002

(87) PCT Pub. No.: WO01/70632

PCT Pub. Date: Sep. 27, 2001

(51) Int. Cl.$^7$ .................................. C09C 1/36
(52) U.S. Cl. ................ 106/439; 106/419; 106/440; 106/442; 106/444; 106/449; 106/456; 106/461; 106/467
(58) Field of Search ................ 106/419, 439, 106/440, 442, 444, 449, 456, 461, 467

(56) References Cited

U.S. PATENT DOCUMENTS

| | | | |
|---|---|---|---|
| 4,036,662 A | 7/1977 | Rademachers et al. | 106/430 |
| 5,009,711 A * | 4/1991 | Emmert et al. | 106/415 |
| 5,972,098 A | 10/1999 | Andes et al. | 106/436 |

FOREIGN PATENT DOCUMENTS

| | | |
|---|---|---|
| EP | 0852250 A1 | 7/1998 |
| EP | 0949202 A1 | 10/1999 |
| JP | 58-026034 | 2/1983 |
| JP | 58-041726 | 3/1983 |
| JP | 08-073224 | 3/1996 |
| JP | 10-219134 | 8/1998 |
| JP | 2001-040288 | 2/2001 |

OTHER PUBLICATIONS

F. Suzuki, The Powder Development by Use of the Reaction of Metal Oxides; 57 (12) 652–659 (1984) (partial translation, see specification at p. 2.).

International Search Report Apr. 17, 2001.

* cited by examiner

*Primary Examiner*—Mark L. Bell
*Assistant Examiner*—Shalie Manlove
(74) *Attorney, Agent, or Firm*—Armstrong, Westerman & Hattori, LLP

(57) ABSTRACT

The present invention provides a yellow pigment which contains a titanium-iron complex oxide of the pseudo-brookite type and produces a stabilized color more yellowish than conventionally and which is universally usable for coloring plastics, ceramics and coating compositions. The pigment of the invention is a titanium-iron complex oxide pigment which contains a pseudo-brookite complex oxide represented by the composition formula $(M_{1-x} \cdot Fe_x)O \cdot 2TiO_2$ or the composition formula $(Fe_{1-y} \cdot Al_y)_2O_3 \cdot TiO_2$ wherein M is one of the bivalent metals Mg, Sr and Zn, the ratios of Fe, Al and M to Ti are in the respective ranges of $0.3 \leq Fe/Ti \leq 4.5$, $0 \leq Al/Ti \leq 6.5$ and $0 \leq M/Ti \leq 2.6$, and x and y are in the respective ranges of $0 \leq x < 1$ and $0 \leq y < 1$.

8 Claims, No Drawings

TITANIUM-IRON BASED COMPOSITE OXIDE PIGMENT AND METHOD FOR PRODUCTION THEREOF

TECHNICAL FIELD

The present invention relates to titanium-iron complex oxide pigments producing a yellow color for use in coloring plastics, ceramics, coating compositions, etc. and processes for preparing the same.

BACKGROUND ART

Complex oxide pigments of the pseudo-brookite type are known as titanium-iron inorganic pigments which produce a yellow color.

The specification of U.S. Pat. No. 4,036,662 discloses pigments of pseudo-brookite and of pseudo-brookite and rutile in mixture which are represented by $Fe_2TiO_5 \cdot xTiO_2$ wherein x is 0 to 15. According to the disclosure, the color tone is adjustable by varying the mixing ratio of $Fe_2TiO_5$ and $TiO_2$. The specification states that fine particles, up to 1 $\mu m$ in mean size, are obtained by mixing the materials in the form of aqueous suspensions, dehydrating the mixture and thereafter calcining the mixture at a temperature of 600 to 1100° C., and that a yellow pigment is available by making the calcining atmosphere reductive with use of carbon black or a like reducing agent. However, the pigment obtained by the above method still remains to be improved in saturation, tinting strength and covering power for use in coloring plastics and coating compositions of which high functions are required.

Fukuji Suzuki prepared $Fe_2TiO_5$ of the pseudo-brookite type by mixing titanium oxide of the anatase type and alpha-iron oxide (hematite) and calcining the mixture of 1100 to 1200° C. in the atmosphere ["Shikizai (coloring materials)," 57(12)652–659, 1984]. Although this method starts to produce $Fe_2TiO_5$ at a temperature of not lower than 800° C., the reaction mixture needs to be heated to 1200° C. for the completion of the reaction. The method therefore has the drawbacks of requiring a high calcining cost for preparing the product at such a high temperature and necessitating much time for pulverization since the reaction mixture has been calcined to a great extent. Additionally, the resulting product $Fe_2TiO_5$ has the same composition as the product of the foregoing U.S. patent wherein x is 0, and is insofar in saturation, tinting strength and covering power.

JP-A No. 8-73224(1996) discloses a process for preparing complex oxide pigments of the pseudo-brookite type represented by $Al_xFe_{2-x}TiO_b \cdot yTiO_2$ wherein $0 < x \leq 1$ and $0 \leq y$. According to the disclosure, intensely yellow finely particulate complex oxide pigments having high saturation are prepared by dispersing or dissolving oxides, hydroxides or water-soluble salts of iron and aluminum in a hydrated titanium oxide slurry, causing the resulting slurry to produce a coprecipitate at a suitable pH, and washing the coprecipitate with water, followed by filtration, drying and calcining at a temperature of about 800 to about 1100° C. This process nevertheless involves limitations to starting materials, requires complex equipment and steps and is high in production cost.

Thus, titanium-iron complex oxide pigments of pseudo-brookite are produced by mixing titanium oxide or metatitanic acid with an iron oxide, iron hydroxide or water-soluble iron salt in a predetermined ratio in a dry or wet state, or causing an aqueous solution of water-soluble salts of titanium and iron to undergo coprecipitation and washing the precipitate, followed by drying to obtain a material mixture, and calcining the mixture in air or a reducing atmosphere at a temperature of 800 to 1200° C. In the calcining step, Ti, Fe or O from particles of one of the materials diffuse into those of the other, thereby giving rise of a reaction to form and grow pseudo-brookite crystals. To industrially manufacture a stabilized product, especially iron-containing complex oxides, by such a solid-phase reaction, the stability of the materials to be used, the stability of the materials as mixed together and the stability of calcining operation are of extreme importance.

The materials, especially iron compounds, such as iron oxides or iron hydroxides, are easily oxidized or reduced by a slight change in temperature and atmosphere. Accordingly, it is difficult to obtain materials which always exhibit constant reactivity during calcining, hence limitations of the materials usable. Further when materials are mixed together which are different in specific gravity, particle size or bulkiness, segregation is liable to occur in the mixture being prepared by mixing or as prepared by mixing owing to the difference in specific gravity or particle size, presenting difficulty in affording a material mixture of uniform composition.

Further since mass transfer between the particulate materials is a rete controlling factor of the reaction, low temperatures lead to a low reaction rate to result in low productivity, quantity manufacture of the desired product on an industrial scale requires a high temperature for calcining.

Because the iron oxide or iron hydroxide in the material mixture is easily oxidized or reduced by a slight change in the temperature or atmosphere, a product of uniform color is not available unless the calcining temperature and atmosphere are controlled closely.

It is known well that when iron-containing complex oxide pigments are to be manufactured with good stability and with uniform color produced, it is necessary to use materials of high quality as controlled strictly, to hold the materials as uniformly mixed at all times and to calcine the mixture with the temperature, time and atmosphere controlled strictly. These requirements make the equipment and process complex and result in an increased manufacturing cost.

In view of the foregoing problems, an object of the present invention is to provide a yellow pigment which contains a titanium-iron complex oxide of the pseudo-brookite type and produces a stabilized color more yellowish than conventionally and which is universally usable for coloring plastics, ceramics and coating compositions.

DISCLOSURE OF THE INVENTION

The present applicant previously proposed a process for producing a yellow pigment of the rutile type by mixing titanium oxide, oxide of one of Co, Cr and Ni and oxide of one of Sb, Nb and W, grinding the resulting composition by a dry method using a mill to prepare composite particles by utilizing a mechanochemical reaction, and calcining the particles [see JP-A No. 10-219134 (1988)]. The process is adapted for the production of complex oxide pigments of the rutile type such as Ti-Sb-Cr, Ti-Sb-Ni, Ti-Nb-Co or Ti-W-Ni.

The present inventors have subsequently conducted research for the production of yellow pigments and found that a pseudo-brookite complex oxide pigment of outstanding characteristics can be obtained by applying a mechanochemical reaction to titanium-iron material particles to prepare composite particles, followed by calcining.

Stated more specifically, the present invention provides a first complex oxide pigment, i.e., a titanium-iron complex oxide pigment which is characterized in that the pigment contains a pseudo-brookite complex oxide represented by:

the composition formula $(M_{1-x} \cdot Fe_x)O \cdot TiO_2$ or the composition formula $(Fe_{1-y} \cdot Al_y)_2O_3 \cdot TiO_2$ wherein M is one of the bivalent metals Mg, Sr and Z, the ratios of Fe, Al and M to Ti are in the respective ranges of $0.3 \leq Fe/Ti \leq 4.5$, $0 \leq Al/Ti \leq 6.5$, and $0 \leq M/Ti \leq 2.6$, and x and y are in the respective ranges of $0 \leq x < 1$ and $0 \leq y < 1$.

The present invention further provides a process for producing the first complex oxide pigment. This process is characterized by mixing particulate starting materials for Ti, Fe, Al and M in specified proportions, grinding the resulting particulate composition in a dry state to give the composition energy sufficient to cause a mechanochemical reaction, join the particles to one another and prepare composite particles wherein the elements Ti, Fe, Al and M are present, and calcining the composite particles at 700 to 1200° C.

The present invention provides a second complex oxide pigment, i.e., a titanium-iron complex oxide pigment which is characterized in that the pigment contains a pseudo-brookite complex oxide, and has added thereto at least one element selected from the group consisting of Li, B, Si and Ca, the pseudo-brookite complex oxide being represented by:

the composition formula $(M_{1-x} \cdot Fe_x)O \cdot 2TiO_2$ or the composition formula $(Fe_{1-y} \cdot Al_y)_2O_3 \cdot TiO_2$ wherein M is at least one metal selected from the group consisting of the bivalent metals Mg, Sr and Zn, the ratios of Fe, Al and M to Ti are in the respective ranges of $0.3 \leq Fe/Ti \leq 4.5$, $0 \leq Al/Ti \leq 6.5$ and $0 \leq M/Ti \leq 2.6$, and x and y are in the respective ranges of $0 \leq x < 1$ and $0 \leq y < 1$. The second complex oxide pigment remains free of discoloration even when mixed with resins with heating and has high heat resistance.

The present invention further provides a process for producing the second complex oxide pigment. This process is characterized by mixing particulate starting materials for Ti, Fe, Al and M, and at least one element selected from the group consisting of Li, B, Si and Ca in specified proportions, grinding the resulting particulate composition in a dry state to give the composition energy sufficient to cause a mechanochemical reaction, join the particles to one another and prepare composite particles wherein the elements Ti, Fe, Al and M, and at least one element selected from the group consisting of Li, B, Si and Ca are present, and calcining the composite particles at 700 to 1200° C.

Instead of the conventional method of mixing the particulate starting materials (source substances for the elements providing the first or second complex oxide pigment) in predetermined proportions and thereafter treating the mixture wet or dry using a mixer, the process of the present invention grinds the particulate starting materials in a dry state with use of a mill having a high grinding efficiency to pulverize and mix the particulate materials. The dry grinding treatment is thereafter continued further to give the particulate materials great mechanical energy, such as that of grinding, friction, compression, tension, bending and collision, not less than is required for grinding, whereby the material particles which are pulverized and uniformly mixed together are joined to one another to become greater in size, thus producing a phenomenon termed "inverse grinding." In this way, composite secondary particles are formed wherein the elements incorporated into the starting composition are present uniformly in a definite ratio. Along with this phenomenon, the starting materials diminish in crystallinity and become partly amorphous. This is what is termed a mechanochemical reaction.

When the dry grinding treatment of the particulate starting materials resorting to the mechanochemical reaction is conducted for a longer period of time, the increase of particle sizes due to inverse grinding and the decrease of particle sizes due to grinding take place at the same time, so that the treatment has the feature that variations in particle size reach equilibrium. Accordingly, even if the starting materials differ in specific gravity, particle size or bulkiness, composite secondary particles can be obtained always as stabilized in particle size and with a uniform composition.

The composite secondary particles obtained by the mechanochemical reaction are not in the form of a mere mixture but contain all the elements incorporated into the starting composition, uniformly and compactly in a definition ratio, are therefore very high in reactivity and can be calcined at a lower temperature within a shorter period of time, affording a pigment which is exceedingly higher in saturation and more excellent in tinting strength than those obtained by calcining a mixture obtained by the conventional method of wet or dry mixing.

The process of the present invention merely grinds the starting materials in a dry state using a mill instead of mixing the starting materials in the conventional manner, whereby the foregoing object can be accomplished, consequently necessitating no complex production step such as coprecipitation. Furthermore, the composition can be calcined at a lower temperature within a shorter period of time, and the calcined product can be pulverized easily. The process is therefore advantageous also in cost. Although the conventional material mixing method encounters difficulty in preparing a mixture of uniform composition from materials which are different in specific gravity or particle size, starting materials which are different in particle size or specific gravity can always be made into composite secondary particles of uniform composition by the dry grinding treatment of the process of the invention. This eliminates limitations of the starting materials.

The mechanochemical reaction per se is already known as disclosed in Kiichro Kubo, "Mechanochemistry of Inorganic Materials," (published by Sogogijutsu Shuppan, 1987), and it is disclosed that the reaction is applicable to the surface modification of particles and to the precipitate of high-temperature superconductive substances, whereas the application of the reaction to the preparation of pseudo-brookite complex oxide pigments still remains to be disclosed.

The starting materials for use in preparing the first complex oxide pigment, i.e. the source substances for the elements providing the pigment, may be, for example, oxides, hydroxides or carbonates of Ti, Fe, Al and M (which is at least one metal selected from the group consisting of the bivalent metals Mg, Sr and Zn), or compounds of these elements which become oxides when heated. Generally useful Ti sources are titanium oxide of the anatase type, titanium oxide of the rutile type, metatitanic acid (hydrated titanium oxide), etc. Examples of preferred Fe sources are iron oxides, yellow iron hydroxide, iron chlorides, iron nitrates, etc. Examples of useful Al sources are aluminum oxide, aluminum hydroxide, aluminum chloride, aluminum nitrate, aluminum acetate, etc. Examples of preferred Mg sources, Sr sources and Zn sources are oxides, hydroxides, carbonates, chlorides, nitrates, etc. of these metals.

Among the starting materials for use in preparing the second complex oxide pigment, i.e. among the source substances for the elements providing the pigment, the source substances for Ti, Fe, Al and M are the same as those used for the preparation of the first complex oxide pigment. Useful source substances for at least one element selected from the group consisting of Li, B, Si and Ca may be the oxide, hydroxide, carbonate, chloride, nitrate, etc. of the element.

Since the composite secondary particles obtained by the dry grinding treatment of the starting materials are not susceptible to the influence of the specific gravity, the particle size or the bulkiness of the starting materials, any of these materials can be widely varying in particle size or bulkiness, and satisfactory to use are inexpensive materials which are generally used widely. Examples of starting materials which are preferable from the viewpoint of cost and quantities to be supplied are titanium oxide of the anatase type or rutile type or metatitanic acid, ferrous oxide, ferric oxide, yellow iron hydroxide, aluminum oxide, magnesium carbonate, strontium carbonate, zinc oxide, lithium carbonate, boric acid, silicon oxide, calcium carbonate, etc. which are not surface-treated.

In producing the first and second complex oxide pigments, the source substances for Ti, Fe, Al and M are used in a ratio which is so determined that the ratios of Fe, Al and M (at least one metal selected from the group consisting of the bivalent metals Mg, Sr and Zn) to Ti in the following composition formula:

$(M_{1-x} \cdot Fe_x)O \cdot 2TiO_2$ wherein C≦x<1, or

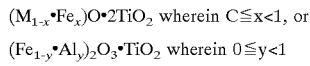
$(Fe_{1-y} \cdot Al_y)_2O_3 \cdot TiO_2$ wherein 0≦y<1 will be in the respective ranges of 0.3≦Fe/Ti≦4.5, 0≦Al/Ti≦6.5 and 0≦M/Ti≦2.6.

Ti and Fe are essential components. If Fe/Ti<0.3, the content of the chromophore component Fe is too small to produce the color. If Fe/Ti>4.5, an excess of Fe is present, with the result that the product becomes turbid yellow with reddish brown incorporated into the color owing to the formation of $Fe_2O_2$ in addition to pseudo-brookite crystals. More preferably, the range is 0.4≦Fe/Ti≦3.5.

The addition of Al is effective for adjusting the color tone, whereas if Al/Ti>6.5, the product appears reddish and is impaired in tinting strength and covering power. The ratio is more preferably in the range of 0.1≦Al/Ti≦5.

Although Mg, Sr and Zn are not chromophore elements, addition of these elements makes it possible to adjust the density of color to be produced and the color tone.

If M/Ti>2.6, increased amounts of M and Ti are present in the composition, consequently reducing the relative amount of the chromophore component Fe and rendering the pigment unable to produce a satisfactory color. More preferably, the range is 0≦M/Ti≦2.

In producing the second complex oxide pigment, the proportion of the source substance to be used for at least one element selected from the group consisting of Li, B, Si and Ca is determined preferably in the following manner.

The proportion of the source substance to be used for Li is so determined that Li is in the range of 0.07≦$Li_2O$/N≦0.75 (ratio by weight) relative to the pseudo-brookite complex oxide (N), and that Li has the relationship of 0.015≦Li/Fe≦0.074 with Fe. If 0.07<$Li_2O$/N (ratio by weight), the effect to achieve improved heat resistance is small, whereas when $Li_2O$/N>0.75 (ratio by weight), impaired heat resistance will conversely result. The ratios are more preferably in the respective ranges of 0.07≦$Li_2O$/N≦0.17 (ratio by weight) and 0.015≦Li/Fe≦0.03.

The proportion of the source substance to be used for B is so determined that B is in the range of 0.2≦$B_2O_3$/N≦1.20 (ratio by weight) relative to the pseudo-brookite complex oxide (N), and that B has the relationship of 0.015≦B/Fe≦0.05 with Fe. If 0.2<$B_2O_3$/N (ratio by weight), the effect to achieve improved heat resistance is small, whereas when $B_2O_3$/N>1.20 (ratio by weight), the particles are sintered to a greater extent during calcining and become difficult to pulverize, while the product produces a brown color of dark tone. The ratios are more preferably in the respective ranges of 0.2≦$B_2O_3$/N≦0.43 (ratio by weight) and 0.015≦B/Fe≦0.03.

The proportion of the source substance to be used for Si is so determined that Si is in the range of 0.59≦$SiO_2$/N≦4.90 (ratio by weight) relative to the pseudo-brookite complex oxide (N), and that Si has the relationship of 0.024≦Si/Fe≦0.125 with Fe. If 0.59<$SiO_2$/N (ratio by weight), the effect to achieve improved heat resistance is small, whereas when $SiO_2$/N>4.9 (ratio by weight), the particles are sintered to a greater extent during calcining and become difficult to pulverize, while the product produces a brown color of dark tone. The ratios are more preferably in the respective ranges of 0.59≦$SiO_2$/N≦1.8 (ratio by weight) and 0.024≦Si/Fe≦0.03.

The proportion of the source substance to be used for Ca is so determined that Ca is in the range of 0.55≦CaO/N≦4.50 (ratio by weight) relative to the pseudo-brookite complex oxide (N), and that Ca has the relationship of 0.026≦Ca/Fe≦0.13 with Fe. If 0.55>CaO/N (ratio by weight), the effect to achieve improved heat resistance is small, whereas when CaO/N>4.5 (ratio by weight), the particles are sintered to a greater extent during calcining and become difficult to pulverize, while the product produces a brown color of dark tone. The ratios are more preferably in the respective ranges of 0.55≦CaO/N≦1.71 (ratio by weight) and 0.026≦Ca/Fe≦0.078.

Next, a detailed description will be given of the processes or producing titanium-iron complex oxide pigments of the present invention.

The composition of the source substances for the elements of the first or second complex oxide pigment is ground in a dry state. Examples of mills for use in the dry grinding treatment are those having a high grinding efficiency, such as rotary ball mills, tube mills, vibrating mills, planetary mills, medium-agitating mills, shear grinding mills, and high-speed rotary impact mills. These mills may be of the batchwise type or the continuous type. From the viewpoint of enlarging the scale of industrial operation, ease of control and treatment efficiency, vibrating mills and medium-agitating mills are desirable. Examples of grinding media for dry mills for use with such a medium are balls, cylinders, rods, etc. Examples of materials for such media are alumina, zirconia and like ceramics, steel, tool steel and like metals. Balls are used as the grinding medium for vibrating mills, planetary mills and medium-agitating mills. The size of balls exerts an influence on the size of composite secondary particles resulting from the dry grinding treatment and is generally 1 to 30 mm in diameter. The composition is subjected to the dry grinding treatment for a period of time which varies with the mill to be used, with the charge of starting materials and with the quantity of grinding medium. It is desirable to continue the dry grinding treatment until particle size of the charged starting materials does not decrease and the increase in particle size due to inverse grinding and the decrease in particle size due to grinding are brought into equilibrium to result in no variations in particle size.

To prevent the adhesion of particles of the starting materials to the grinding medium during the dry grinding treatment and to effectively give rise to the mechanochemical reaction, a liquid auxiliary agent can be added under the conditions of dry grinding treatment. Examples of auxiliary agents usable for the dry grinding treatment are ethanol, propanol and like alcohols; ethylene glycol, propylene glycol, glycerin and like polyhydric alcohols; diethanolamine, triethanolamine and like alcohol amines; stearic acid; waxes of low melting point; etc. These auxiliary agents are used usually in an amount of 0.05 to 5 wt. % based on the charge of starting materials although the amount varies with the type of auxiliary agent, the particle size of the particulate starting materials and the surface area of the grinding medium. If the amount of the auxiliary agent is too small, particles of starting materials will adhere to the inner wall of the mill or to the grinding medium, hampering the grinding and mixing operation and failing to produce composite secondary particles. If an excessive amount of auxiliary agent is used, the treatment fails to form composite secondary particles although the starting materials are ground and mixed together.

Next, the composite secondary particles are calcined in a usual calcining furnace in the atmosphere at a temperature of 700 to 1200° C. for 0.5 to 10 hours. If the calcining temperature is below 700° C., a lower reaction rate will result to necessitate too long a calcining time. Further if the calcining temperature is in excess of 1200° C., the product becomes sintered to excess, presenting difficulty in adjusting the particle size of the calcined product. Preferably, the calcining operation is conducted at a temperature of 800 to 1100° C. for 1 to 6 hours. The calcining atmosphere is not limited particularly and may be the atmosphere.

The process for producing the first complex oxide pigment by subjecting the particulate starting materials for the pigment of the pseudo-brookite to the dry grinding treatment makes the particulate starting materials amorphous to diminish the activating energy required to give rise to a solid-phase reaction during calcining, joins the particles to one another firmly, remarkably increases the number of particle-to-particle contact points which provide sites where the reaction is initiated, and further permits all the elements used to be uniformly and compactly present within the particles in a definite ratio. Accordingly, the process assures very high reactivity and a remarkably increased solid-phase reaction rate. Being subjected to the dry grinding treatment, the particulate starting materials can be calcined at a lower temperature for a shorter period of time than conventionally, affording a pigment with good stability which contains a highly yellowish pseudo-brookite complex oxide having high saturation and outstanding tinting strength.

Furthermore, the second complex oxide pigment having Li, B, Si and/or Ca incorporated therein remains free of discoloration even if mixed with a resin with heating and has high heat resistance.

Thus, the present invention makes it possible to produce yellow pigments which contain a titanium-iron complex oxide of the pseudo-brookite type and which are high in saturation, excellent in tinting strength, intensely yellowish and usable for coloring plastics, ceramics and coating compositions.

BEST MODE FOR CARRYING OUT THE INVENTION

Examples of the present invention are given below.

Used as starting materials (source substances for the elements) were Ti sources which were titanium oxide of the anatase type (99% in $TiO_2$ content, 0.9 $\mu$m in mean particle size) and dry metatitanic acid (83% i $TiO_2$ content, 0.4 $\mu$m in mean particle size), Fe sources which were ferric oxide (99% in $Fe_2O_3$ content, 1.2 $\mu$m in mean particle size) and ferrous oxide (99% in $Fe(CH)_2$ content, 0.3 $\mu$m in mean particle size), Al sources which were fine powder of aluminum hydroxide (98% in $Al(OH)_3$ content, 1.1 $\mu$m in mean particle size) and coarse powder of aluminum hydroxide (98% in $Al(OH)_3$ content, 8 $\mu$m in mean particle size), Mg source which was magnesium carbonate (99% in $MgCO_3$ content, 0.5 $\mu$m in mean particle size), Sr source which was strontium carbonate (98% in $SrCO_3$ content, 0.7 $\mu$m in mean particle size), Zn source which was zinc oxide (99% in ZnO content, 0.5 $\mu$m in mean particle size), Li source which was lithium carbonate (99% in $Li_2CO_3$ content), B source which was boric acid (99% in $H_3BO_3$ content), Si source which was silicon oxide (99% in $SiO_2$ content, 1.0 $\mu$m in mean particle size), and Ca source which was calcium carbonate (98% in $CaCO_3$ content, 1.8 $\mu$m in mean particle size).

Incidentally, Examples 1 to 3 relate to the compositions of first complex oxide pigments and the influence of composition ranges, Example 4 to the influence of the calcining temperature of first complex oxide pigments, and the kind and particle size of starting materials, Example 5 to the influence of the calcining time of first complex oxide pigments, Example 6 to the influence of different kinds of mills used for first complex oxide pigments, and Examples 7 to 13 to the heat resistance of second complex oxide pigments.

EXAMPLE 1

Particulate starting materials were used in the proportions listed in Table 1 to obtain compositions 1 to 4. Each of the compositions was placed into a grinding container, and ground in a dry state using a mill and a grinding medium placed in. The charge of starting materials was 500 g, the grinding medium was 2000 g of alumina balls, 15 mm in diameter, the mill used was a vibrating mill (Model MB-1) product of Chuo Kakoki Co., Ltd., and the grinding container was a porcelain pot having a capacity of 2000 ml. The materials were subjected to a dry grinding treatment for 30 minutes at room temperature.

The treated particulate composition was thereafter taken out of the mill, placed into a crucible and calcined in an electric furnace at 900° C. for 4 hours. The calcined product obtained was pulverized to a mean particle size of 0.07±0.02 $\mu$m using a wet ball mill, and the pulverized product was dried to obtain a pigment. Thus pigments A1 to A4 were prepared.

TABLE 1

| Composition | 1 | 2 | 3 | 4 |
| --- | --- | --- | --- | --- |
| Titanium oxide | 74 | 67 | 54 | 33 |
| Ferric oxide | 26 | 33 | 46 | 67 |
| Fe/Ti | 0.36 | 0.50 | 0.87 | 2.07 |

Measuring the Color of Coatings 4 g of each pigment, 40 g of acrylic lacquer and 40 g of glass beads were placed into a 70-ml glass bottle and shaken for 15 minutes using a paint shaker (product of Red Devil Co.) to prepare a coating composition. The coating composition was applied to art paper to a thickness of 150 $\mu$m using an applicator and then dried. The coating was thereafter checked for color with a spectrophotometric colorimeter. Table 2 shows the measurements using the CIELAB color system.

TABLE 2

| Pigment | A1 | A2 | A3 | A4 |
| --- | --- | --- | --- | --- |
| L* | 63.4 | 60.8 | 56.9 | 46.7 |
| a* | 17.3 | 17.0 | 18.3 | 22.8 |
| b* | 47.6 | 48.4 | 50.5 | 48.0 |

Pigments A1 to A4 of Example 1 were all more than 47 in b* value, producing an intensely yellowish color.

COMPARATIVE EXAMPLE 1

Pigments B1 to B4 were prepared by the same procedure as in Example 1 except that compositions 1 to 4 listed in Table 1 were ground and mixed wet. Stated more specifically, using the same vibrating mill, grinding container, grinding medium and charge of starting materials as in Example 1, 500 ml of water was added to each composition, which was then ground for mixing in a wet state for 30 minutes. The mixture was thereafter dried in a drying oven at 110° C. to obtain a particulate starting material mixture. The mixture was calcined and pulverized in the same manner as in Example 1 to obtain a pigment. Thus, pigments B1 to B4 were obtained.

These pigments were used to prepare coatings which were checked for color by the same method as in Example 1. Table 3 shows the measurements using the CIELAB color system.

TABLE 3

| Pigment | B1 | B2 | B3 | B4 |
| --- | --- | --- | --- | --- |
| L* | 53.1 | 57.5 | 50.8 | 38.0 |
| a* | 21.4 | 21.5 | 25.6 | 30.9 |
| b* | 45.8 | 45.6 | 44.4 | 28.5 |

Relative to pigments A1 to A4 of Example 1, pigments B1 to B4 of Comparative Example 1 are smaller in L* value and darker, greater in a* value and intensely reddish, and smaller in b* value and less yellowish.

EXAMPLE 2

Compositions 5 and 6 were prepared using particulate starting materials in the proportions listed in Table 4. The compositions were ground in a dry state, calcined and pulverized in the same manner as in Example 1 to obtain pigments A5 and A6.

TABLE 4

| Composition | 5 | 6 |
| --- | --- | --- |
| Titanium oxide | 40 | 48 |
| Ferric oxide | 40 | 48 |
| Zinc oxide | 20 | 34 |
| Strontium carbonate |  | 4 |
| Fe/Ti | 1.02 | 1.02 |
| M/Ti | 0.49 | 0.05 |

These pigments were used to prepare coatings, which were checked for color by the same method as in Example 1. Table 5 shows the measurements using the CIELAB color system.

TABLE 5

| Pigment | A5 | A6 |
| --- | --- | --- |
| L* | 61.5 | 47.7 |
| a* | 18.7 | 23.2 |
| b* | 53.6 | 42.4 |

While Zn was incorporated into the pigments in Example 2, the b* value was 53, indicating an intense yellow color produced. The presence of Sr added entailed a lower L* value and diminished yellow but was effective for adjusting the color tone.

COMPARATIVE EXAMPLE 2

Pigments B5 and B6 were prepared by the same procedure as in Example 2 with the exception of grinding compositions 5 and 6 listed in Table 4 in a wet state for mixing.

These pigments were used to form coatings, which were checked for color by the same method as in Example 1. Table 6 shows the measurements using the CIELAB color system.

TABLE 6

| Pigment | B5 | B6 |
|---|---|---|
| L* | 56.7 | 42.8 |
| a* | 23.4 | 30.7 |
| b* | 45.8 | 33.9 |

Relative to pigments A5 and A6 of Example 2, pigments B5 and B6 of Comparative Example 2 are smaller in L* value and darker, greater in a* value and intensely reddish, and smaller in b* value and less yellowish.

EXAMPLE 3

Particulate starting materials were used in the proportions listed in Table 7 to obtain compositions 7 to 11. The compositions were ground dry, calcined and pulverized in the same manner as in Example 1 to prepare pigments A7 to A11.

TABLE 7

| Composition | 7 | 8 | 9 | 10 | 11 |
|---|---|---|---|---|---|
| Titanium oxide | 65 | 62 | 26 | 11 | 39 |
| Ferric oxide | 33 | 31 | 25 | 23 | 27 |
| Aluminum hydroxide fine powder | 2 | 7 | 49 | 66 | 11 |
| Magnesium carbonate | | | | | 23 |
| Fe/Ti | 0.52 | 0.51 | 0.98 | 2.13 | 0.71 |
| Al/Ti | 0.03 | 0.12 | 1.93 | 6.15 | 0.29 |
| M/Ti | 0 | 0 | 0 | 0 | 0.50 |

These pigments were used to form coatings, which were checked for color by the same method as in Example 1. Table 8 shows the measurements using the CIELAB color system.

TABLE 8

| Pigment | A7 | A8 | A9 | A10 | A11 |
|---|---|---|---|---|---|
| L* | 61.9 | 63.4 | 68.6 | 56.9 | 68.3 |
| a* | 16.4 | 15.4 | 10.6 | 23.6 | 14.1 |
| b* | 50.9 | 52.1 | 58.3 | 56.1 | 54.3 |

COMPARATIVE EXAMPLE 3

Pigments B7 to B11 were prepared by the same procedure as in Example 3 with the exception of grinding compositions 7 to 11 listed in Table 7 in a wet state for mixing.

These pigments were used to form coatings, which were checked for color by the same method as in Example 1. Table 9 shows the measurements using the CIELAB color system.

TABLE 9

| Pigment | B7 | B8 | B9 | B10 | B11 |
|---|---|---|---|---|---|
| L* | 52.1 | 50.3 | 45.7 | 43.6 | 47.6 |
| a* | 25.7 | 23.8 | 32.1 | 28.8 | 29.8 |
| b* | 48.8 | 49.1 | 31.0 | 31.5 | 29.8 |

Relative to pigments A7 to A11 of Example 3, pigments B7 to B11 of Comparative Example 3 are smaller in L* value and darker, greater in a* value and intensely reddish, and smaller in b* value and less yellowish.

EXAMPLE 4

Composition 12 was prepared using particulate starting materials in the proportions listed in Table 10. The composition was subjected to a dry grinding treatment in the same manner as in Example 1, and the resulting product was divided into four portions, which were calcined at a temperature of 800, 900, 1000 or 1100° C. for 4 hours and thereafter pulverized to obtain pigments A12 to A15.

TABLE 10

| Composition | 12 |
|---|---|
| Dry metatitanic acid | 64 |
| Ferrous oxide | 30 |
| Aluminum hydroxide coarse powder | 6 |
| Fe/Ti | 0.51 |
| Al/Ti | 0.12 |

These pigments were used to form coatings, which were checked for color by the same method as in Example 1. Table 11 shows the measurements using the CIELAB color system.

TABLE 11

| Pigment | A12 | A13 | A14 | A15 | (A8) |
|---|---|---|---|---|---|
| Calcining temp. (° C.) | 800 | 900 | 1000 | 1100 | (900) |
| L* | 60.6 | 61.7 | 59.3 | 56.7 | (63.4) |
| a* | 18.6 | 16.7 | 17.4 | 18.0 | (15.4) |
| b* | 50.1 | 51.9 | 53.0 | 50.3 | (52.1) |
| ΔE* (relative to A12-800) | — | 2.85 | 3.39 | 3.90 | |
| ΔE* (relative to A8) | 4.69 | 2.16 | 4.66 | 7.40 | |

Pigments A12 to A15 of Example 4, which were obtained at a calcining temperature of 800 to 1100° C., were all above 50 in b* value and appeared yellow. When checked for color difference (ΔE*) relative to the pigment obtained by calcining at 800° C. (A12), those obtained by calcining at 900 to 1100° C. were smaller than 4 in ΔE*, showing a stabilized color over a wide temperature range.

When compared with pigment A8 of Example 3 which is the same as pigment A12 of Example 4 in Fe/Ti and M/Ti, the pigment obtained by calcining at the same temperature (900° C.) as pigment A8 is about 2 in ΔE*, hence an equivalent color produced despite the difference in starting materials or particle size.

COMPARATIVE EXAMPLE 4

Pigments B12 to B15 were prepared by the same procedure as in Example 4 with the exception of grinding composition 12 listed in Table 10 in a wet state for mixing.

These pigments were used to form coatings, which were checked for color by the same method as in Example 1. Table 12 shows the measurements using the CIELAB color system.

TABLE 12

| Pigment | B12 | B13 | B14 | B15 | (B8) |
|---|---|---|---|---|---|
| Calcining temp. (° C.) | 800 | 900 | 1000 | 1100 | (900) |
| L* | 39.3 | 39.1 | 42.5 | 49.3 | (50.3) |
| a* | 30.3 | 27.3 | 23.6 | 20.1 | (23.8) |
| b* | 24.7 | 25.0 | 26.3 | 37.5 | (49.1) |
| ΔE* (relative to B12-800) | — | 3.02 | 7.74 | 19.2 | |
| ΔE* (relative to B8) | 27.6 | 26.8 | 23.7 | 12.3 | |

Pigments B12 to B15 of Comparative Example 4, which were all calcined at a temperature of 800 to 1100° C., were more than 20 in a* value and less than 40 in b* value, producing a reddish brown color. When checked for color difference (ΔE*) relative to the pigment obtained by calcining at 800° C. (B12), the pigment obtained by calcining at 1000° C. was 7.7, and the one obtained at 1100° C. was 19 in ΔE*. This indicates that variations in calcining temperature greatly alter the color produced, hence lack of stability to calcining temperature.

When compared with pigment B8 of Comparative Example 3 which is the same as pigment B12 of Comparative Example 4 in Fe/Ti and M/Ti, the pigment obtained at any calcining temperature is above 10 in ΔE* and produces a greatly different color. This indicates a change in starting material or particle size results in a greatly altered color.

EXAMPLE 5

Composition 16 was prepared using particulate starting materials in the proportions listed in Table 13. The composition was subjected to a dry grinding treatment in the same manner as in Example 1, and the resulting product was divided into four portions, which were calcined at a temperature of 900° C. for 2, 4, 8 or 12 hours and thereafter pulverized to obtain pigments A16 to A19.

TABLE 13

| Composition | 16 |
|---|---|
| Titanium oxide | 18 |
| Ferric oxide | 24 |
| Aluminum hydroxide fine powder | 58 |
| Fe/Ti | 1.36 |
| Al/Ti | 3.3 |

These pigments were used to form coatings, which were checked for color by the same method as in Example 1. Table 14 shows the measurements using the CIELAB color system.

TABLE 14

| Pigment | A16 | A17 | A18 | A19 |
|---|---|---|---|---|
| Calcining time (hrs) | 2 | 4 | 8 | 12 |
| L* | 59.4 | 60.7 | 61.6 | 62.9 |
| a* | 24.1 | 22.0 | 19.3 | 18.0 |
| b* | 50.0 | 52.5 | 53.5 | 55.2 |

Pigments A16 to A19 of Example 5, which were calcined for 2 to 12 hours, were all about 20 in a* value and produced a pale red color, and at least 50 in b* value and produced an intensely yellowish color.

COMPARATIVE EXAMPLE 5

Pigments B16 to B19 were prepared by the same procedure as in Example 5 with the exception of grinding composition 16 listed in Table 13 in a wet state for mixing.

These pigments were used to form coatings, which were checked for color by the same method as in Example 1. Table 15 shows the measurements using the CIELAB color system.

TABLE 15

| Pigment | B16 | B17 | B18 | B19 |
|---|---|---|---|---|
| Calcining time (hrs) | 2 | 4 | 8 | 12 |
| L* | 46.1 | 47.1 | 48.1 | 48.7 |
| a* | 32.4 | 31.8 | 30.7 | 29.8 |
| b* | 34.8 | 36.8 | 38.3 | 39.2 |

Pigments B16 to B19 of Example 5, which were calcined for 2 to 12 hours, were all about 30 in a* value and produced an intense red color, and less than 40 in b* value and produced a pale yellowish color.

EXAMPLE 6

Composition 2 of Example 1 in Table 1 was placed into a grinding container, and ground in a dry state using a mill and a grinding medium placed in. The mill used was a medium-agitating mill (vertical attritor MA-1D, product of Mitsui Mining Co., Ltd.), and the grinding container was a stainless steel container having a capacity of 5000 ml. The charge of starting materials was 200 g. Propylene glycol (0.2 ml) was placed in as an auxiliary agent. The grinding medium was 7500 g of steel balls, 10 mm in diameter.

The dry grinding treatment was conducted at room temperature for 30 minutes or 60 minutes. The resulting product was calcined and pulverized in the same manner as in Example 1 to obtain a pigment. Thus, pigments A20 and A21 were prepared.

These pigments were used to form coatings, which were checked for color by the same method as in Example 1. Table 16 shows the measurements using the CIELAB color system.

TABLE 16

| Pigment | A20 | A21 | (A2) |
|---|---|---|---|
| Dry grinding treatment time (min.) | 30 | 60 | |
| L* | 61.5 | 62.3 | (60.8) |
| a* | 16.8 | 16.4 | (17.0) |
| b* | 49.1 | 50.6 | (48.4) |

Pigments A20 and A21 of Example 6 were prepared using a mill different in type from that used in Example 1, with the dry grinding treatment conducted for an altered period of time. The pigments were substantially equivalent to pigment A2 of Example 1 in the color produced.

EXAMPLE 7

Compositions 17 to 24 were prepared from starting materials used in the proportions listed in Table 17. The compositions were subjected to a dry grinding treatment, calcined and pulverized in the same manner as in Example 1 to obtain pigments C17 to C24.

TABLE 17

| Composition | 17 | 18 | 19 | 20 | 21 | 22 | 23 | 24 |
|---|---|---|---|---|---|---|---|---|
| Titanium oxide | 61.5 | 61.4 | 61.2 | 67.6 | 67.9 | | 61.0 | 59.5 |
| Metatitanic acid | | | | | | 65.2 | | |
| Ferric oxide | 30.9 | 30.8 | 30.7 | 24.0 | 24.1 | 27.3 | 30.6 | 29.9 |
| Ferrous oxide | | | | | | | | |
| Aluminum hydroxide | 7.42 | 7.40 | 7.39 | 7.68 | 7.70 | 6.55 | 7.36 | 7.18 |
| Lithium carbonate | 0.21 | 0.42 | 0.67 | 0.73 | 0.32 | 0.94 | 1.05 | 3.42 |
| $Li_2O$ (wt. %) | 0.09 | 0.17 | 0.28 | 0.30 | 0.13 | 0.44 | 0.44 | 1.45 |
| Li/Fe | 0.015 | 0.029 | 0.047 | 0.066 | 0.029 | 0.074 | 0.074 | 0.247 |

Heat Resistance Test

A 5 g quantity of each pigment and 1 g of zinc stearate were uniformly mixed together in a mortar. The mixture (2.4 g) obtained and 400 g of polypropylene resin (JHH-G, product of Grand Polymer) dried at 60° C. were placed into a plastic container and shaken for 5 minutes using a paint shaker (product of Red Devil Co.) to prepare colored pellets.

The colored pellets were then molded into a colored plate at a temperature of 210° C. or 280° C. using an injection molding machine (without retaining the material within the machine). Alternatively, the material was held in the injection molding machine at 280° C. for 10 minutes and then molded into a plate (with retention). The colored plates were checked for color with a spectrophotometric colorimeter. Relative to the color determined according to the CIELab color system of the plate molded at the temperature of 210° C., the color difference of each of the plates molded at the temperature of 280° C. with or without retention was determined according to the CIELab color system. The heat resistance of the pigment was evaluated based on the result obtained. Table 18 shows the color differences determined.

The pigment was checked for color difference in the same manner as in Example 7 for the evaluation of the heat resistance thereof based on the result obtained. Table 18 shows the color differences determined.

TABLE 18

| Pigment | C17 | C18 | C19 | C20 | C21 | C22 | C23 | C24 | D1 |
|---|---|---|---|---|---|---|---|---|---|
| ΔE* (not retained) | 0.8 | 0.8 | 0.9 | 1.0 | 0.6 | 0.7 | 1.0 | 1.0 | 1.38 |
| ΔE* (retained) | 1.5 | 1.4 | 1.7 | 1.8 | 1.1 | 1.7 | 2.1 | 2.7 | 2.22 |

Pigments C17 to C23 as used for molding at the temperature of 280° C. with or without retention are superior to pigment D1 in heat resistance. The Li/Fe ratio, if in excess of 0.074 as is the case with C24, results in impaired heat resistance. The preferred Li range for improved heat resistance is $0.015 \leq Li/Fe \leq 0.074$.

EXAMPLE 8

Compositions 25 to 31 were prepared from starting materials used in the proportions listed in Table 19. The compositions were subjected to a dry grinding treatment, calcined and pulverized in the same manner as in Example 1 to obtain pigments C25 to C31.

TABLE 19

| Composition | 25 | 26 | 27 | 28 | 29 | 30 | 31 |
|---|---|---|---|---|---|---|---|
| Titanium oxide | 66.31 | 66.06 | 65.70 | 64.12 | 64.40 | 61.19 | 60.90 |
| Ferric oxide | 33.31 | 33.18 | 23.00 | 32.20 | 30.84 | 30.73 | 30.59 |
| Aluminum hydroxide | | | | | 7.41 | 7.38 | 7.25 |
| Boric acid | 0.38 | 0.76 | 1.25 | 3.67 | 0.35 | 0.70 | 1.16 |
| $B_2O_3$ (wt. %) | 0.22 | 0.43 | 0.71 | 2.12 | 0.20 | 0.41 | 0.68 |
| B/Fe | 0.015 | 0.030 | 0.050 | 0.147 | 0.015 | 0.029 | 0.049 |

COMPARATIVE EXAMPLE 6

A composition prepared from composition 17 shown in Table 17 by removing lithium carbonate therefrom was subjected to a dry grinding treatment, calcined and pulverized in the same manner as in Example 1 to obtain pigment D1.

These pigments were checked for color difference in the same manner as in Example 7 for the evaluation of the heat resistance thereof based on the result obtained. Table 20 shows the color differences determined.

TABLE 20

| Pigment | C25 | C26 | C27 | C28 | C29 | C30 | C31 |
|---|---|---|---|---|---|---|---|
| ΔE* (not retained) | 0.85 | 0.73 | 0.65 | 0.63 | 0.88 | 0.84 | 0.71 |
| ΔE* (retained) | 1.28 | 1.11 | 1.08 | 1.01 | 1.45 | 1.33 | 1.35 |

Pigments C25 to C31 as used for molding at the temperature of 280° C. with or without retention are superior to pigment D1 in heat resistance. The preferred range for improved heat resistance is $0.015 \leq B/Fe \leq 0.05$.

EXAMPLE 9

Compositions 32 to 38 were prepared from starting materials used in the proportions listed in Table 21. The compositions were subjected to a dry grinding treatment, calcined and pulverized in the same manner as in Example 1 to obtain pigments C32 to C38.

TABLE 21

| Composition | 32 | 33 | 34 | 35 | 36 | 37 | 38 |
|---|---|---|---|---|---|---|---|
| Titanium oxide | 66.16 | 65.36 | 64.57 | 61.27 | 60.58 | 63.58 | 63.06 |
| Ferric oxide | 33.23 | 32.82 | 32.43 | 30.77 | 30.43 | 31.93 | 31.67 |
| Aluminum hydroxide | | | | 7.39 | 7.31 | 1.53 | 3.80 |
| Silicon oxide | 0.61 | 1.82 | 3.05 | 0.57 | 1.69 | 2.95 | 1.46 |
| $SiO_2$ (wt. %) | 0.61 | 1.81 | 3.07 | 0.59 | 1.75 | 2.99 | 1.49 |
| Si/Fe | 0.024 | 0.074 | 0.125 | 0.025 | 0.074 | 0.123 | 0.061 |

These pigments were checked for color difference in the same manner as in Example 7 for the evaluation of the heat resistance thereof based on the result obtained. Table 22 shows the color differences determined.

TABLE 22

| Pigment | C32 | C33 | C34 | C35 | C36 | C37 | C38 |
|---|---|---|---|---|---|---|---|
| ΔE* (not retained) | 0.94 | 0.85 | 0.84 | 1.03 | 1.08 | 0.95 | 1.01 |
| ΔE* (retained) | 1.45 | 1.31 | 1.30 | 1.44 | 1.43 | 1.37 | 1.36 |

Pigments C32 to C38 as used for molding at the temperature of 280° C. with or without retention are superior to pigment D1 in heat resistance. The preferred range for improved heat resistance is 0.024≦Si/Fe≦0.125.

EXAMPLE 10

Compositions 39 to 45 were prepared from particulate starting materials used in the proportions listed in Table 23. The compositions were subjected to a dry grinding treatment, calcined and pulverized in the same manner as in Example 1 to obtain pigments C39 to C45.

TABLE 23

| Composition | 39 | 40 | 41 | 42 | 43 | 44 | 45 |
|---|---|---|---|---|---|---|---|
| Titanium oxide | 65.85 | 64.46 | 63.12 | 61.00 | 59.81 | 62.18 | 62.36 |
| Ferric oxide | 33.07 | 32.37 | 32.37 | 30.64 | 30.04 | 31.23 | 32.32 |
| Aluminum hydroxide | | | | 7.36 | 7.21 | 1.50 | 3.76 |
| Calcium carbonate | 1.08 | 3.17 | 5.17 | 1.00 | 2.94 | 5.10 | 2.56 |
| CaO (wt. %) | 0.58 | 1.71 | 2.82 | 0.55 | 1.63 | 2.80 | 1.40 |
| Ca/Fe | 0.026 | 0.078 | 0.130 | 0.026 | 0.078 | 0.130 | 0.065 |

These pigments were checked for color difference in the same manner as in Example 7 for the evaluation of the heat resistance thereof based on the result obtained. Table 24 shows the color differences determined.

TABLE 24

| Pigment | C39 | C40 | C41 | C42 | C43 | C44 | C45 |
|---|---|---|---|---|---|---|---|
| ΔE* (not retained) | 0.79 | 0.40 | 0.20 | 0.91 | 0.40 | 0.16 | 0.67 |
| ΔE* (retained) | 1.32 | 0.82 | 0.50 | 1.44 | 0.83 | 0.26 | 0.99 |

Pigments C39 to C45 as used for molding at the temperature of 280° C. with or without retention are superior to pigment D1 in heat resistance. The preferred range for improved heat resistance is 0.026≦Ca/Fe≦0.13.

EXAMPLE 11

Compositions 46 to 48 were prepared from particulate starting materials used in the proportions listed in Table 25. The compositions were subjected to a dry grinding treatment, calcined and pulverized in the same manner as in Example 1 to obtain pigments C46 to C48.

TABLE 25

| Composition | 46 | 47 | 48 |
|---|---|---|---|
| Titanium oxide | 61.00 | 60.90 | 59.60 |
| Ferric oxide | 30.70 | 30.50 | 29.90 |
| Aluminum hydroxide | 7.35 | 7.34 | 7.19 |
| Calcium carbonate | | | 2.93 |
| Silicon oxide | 0.57 | 0.57 | |
| Lithium carbonate | 0.42 | | 0.41 |
| Boric acid | | 0.70 | |
| $SiO_2$ (wt. %) | 0.59 | 0.59 | |
| CaO (wt. %) | | | 1.63 |
| $Li_2O$ (wt. %) | 0.17 | | 0.17 |
| $B_2O_3$ (wt. %) | | 0.41 | |
| Si/Fe | 0.02 | 0.02 | |
| Ca/Fe | | | 0.08 |

TABLE 25-continued

| Composition | 46 | 47 | 48 |
|---|---|---|---|
| Li/Fe | 0.03 | | 0.03 |
| B/Fe | | 0.03 | |

These pigments were checked for color difference in the same manner as in Example 7 for the evaluation of the heat resistance thereof based on the result obtained. Table 26 shows the color differences determined.

TABLE 26

| Pigment | C46 | C47 | C48 |
|---|---|---|---|
| $\Delta E^*$ (not retained) | 0.79 | 0.78 | 0.90 |
| $\Delta E^*$ (retained) | 1.28 | 1.26 | 1.57 |

Pigments C46 to C48 as used for molding at the temperature of 280° C. with or without retention are superior to pigment D1 in heat resistance. Use of any one of Li, B, Si and Ca in combination with the composition affords improved heat resistance.

EXAMPLE 12

Compositions 49 to 52 were prepared from particulate starting materials used in the proportions listed in Table 27. The compositions were subjected to a dry grinding treatment, calcined and pulverized in the same manner as in Example 1 to obtain pigments C49 to C52.

TABLE 27

| Composition | 49 | 50 | 51 | 52 |
|---|---|---|---|---|
| Titanium oxide | 61.50 | 62.30 | 63.00 | 63.20 |
| Ferric oxide | 30.90 | 31.30 | 31.60 | 31.70 |
| Magnesium carbonate | 4.55 | 4.61 | 4.66 | 4.67 |
| Calcium carbonate | 3.03 | | | |
| Silicon oxide | | 1.74 | | |
| Boric acid | | | 0.72 | |
| Lithium carbonate | | | | 0.44 |
| CaO (wt. %) | 1.72 | | | |
| $SiO_2$ (wt. %) | | 1.84 | | |
| $B_2O_3$ (wt. %) | | | 0.43 | |
| $Li_2O$ (wt. %) | | | | 0.19 |
| Ca/Fe | 0.08 | | | |
| Si/Fe | | 0.07 | | |
| B/Fe | | | 0.03 | |
| Li/Fe | | | | 0.03 |

These pigments were checked for color difference in the same manner as in Example 7 for the evaluation of the heat resistance thereof based on the result obtained. Table 28 shows the color differences determined.

TABLE 28

| Pigment | C49 | C50 | C51 | C52 |
|---|---|---|---|---|
| $\Delta E^*$ (not retained) | 0.65 | 1.06 | 1.01 | 0.92 |
| $\Delta E^*$ (retained) | 1.06 | 1.63 | 1.69 | 1.58 |

Pigments C49 to C52 as used for molding at the temperature of 280° C. with or without retention are superior to pigment D1 in heat resistance. Use of Li, B, Si or Ca in combination with a composition containing Mg or like bivalent metal provides improved heat resistance.

EXAMPLE 13

Composition 43 of Example 23 listed in Table 23 was subjected to a dry grinding treatment at room temperature for 30 minutes in the same manner as in Example 6 using the medium-agitating mill (vertical attritor MA-1D, product of Mitsui Mining Co., Ltd.) which was used in Example 6.

The ground product was thereafter calcined and pulverized in the same manner as in Example 1 to obtain pigment C53.

The pigment was checked for color difference in the same manner as in Example 7 for the evaluation of the heat resistance thereof based on the result obtained. Table 29 shows the color differences determined.

TABLE 29

| Pigment | C53 | (C43) |
|---|---|---|
| $\Delta E^*$ (not retained) | 0.63 | (0.40) |
| $\Delta E^*$ (retained) | 1.06 | (0.83) |

Pigment C53 was prepared using a mill different in type from that used in Example 23, with the dry grinding treatment conducted for an altered period of time. The pigment was comparable to pigment C43 of Example 23 in heat resistance.

INDUSTRIAL APPLICABILITY

The present invention provides yellow pigments which contain a titanium-iron complex oxide of the pseudo-brookite type and which are high in saturation, excellent in tinting strength, intensely yellowish and usable for coloring plastics, ceramics and coating compositions.

What is claimed is:

1. A titanium-iron complex oxide pigment wherein the pigment contains a pseudo-brookite complex oxide represented by:

the composition formula $(M_{1-x}.Fe_x)O.2TiO_2$ or the composition formula $(Fe_{1-y}.Al_y)_2O_3.TiO_2$ wherein M is at least one metal selected from the group consisting of the bivalent metals Mg, Sr and Zn, the ratios of Fe, Al and M to Ti are in the respective ranges of $0.3 \leq Fe/Ti \leq 4.5$, $0 \leq Al/Ti \leq 6.5$ and $0 \leq M/Ti \leq 2.6$, and x and y are in the respective ranges of $0 \leq x < 1$ and $0 \leq y < 1$.

2. A process for producing a titanium-iron complex oxide pigment according to claim 1 including the steps of:

mixing particulates of substances containing Ti, Fe, Al and M in specified proportions, grinding the resulting particulate composition in a dry state to give the composition energy sufficient to cause a mechanochemical reaction, join the particles to one another and prepare composite particles wherein the elements Ti, Fe, Al and M are present, and calcining the composite particles at 700 to 1200° C.

3. A titanium-iron complex oxide pigment wherein the pigment contains a pseudo-brookite complex oxide, and has added thereto at least one element selected from the group consisting of Li, B, Si and Ca, the pseudo-brookite complex oxide being represented by:

the composition formula $(M_{1-x}.Fe_x)O.2TiO_2$ or the composition formula $(Fe_{1-y}.Al_y)_2O_3.TiO_2$ wherein M is at least one metal selected from the group consisting of the bivalent metals Mg, Sr and Zn, the ratios of Fe, Al and M to Ti are in the respective ranges of $0.3 \leq Fe/Ti \leq 4.5$, $0 \leq Al/Ti \leq 6.5$ and $0 \leq M/Ti \leq 2.6$, and x and y are in the respective ranges of $0 \leq x < 1$ and $0 \leq y < 1$.

4. A process for producing a titanium-iron complex oxide pigment according to claim 3 comprising the steps of:

mixing particulates of substances containing Ti, Fe, Al and M, and at least one element selected from the group consisting of Li, B, Si and Ca in specified proportions, grinding the resulting particulate composition in a dry state to give the composition energy sufficient to cause a mechanochemical reaction, join the particles to one another and prepare composite particles wherein the elements Ti, Fe, Al and M, and at least one element selected from the group consisting of Li, B, Si and Ca are present, and calcining the composite particles at 700 to 1200° C.

5. A titanium-iron complex oxide pigment according to claim 3 wherein Li is incorporated therein so as to have the relationship of $0.07 \leq Li_2O/N \leq 0.75$ (ratio by weight) with the pseudo-brookite complex oxide (N) and the relationship of $0.015 \leq Li/Fe \leq 0.074$ with Fe.

6. A titanium-iron complex oxide pigment according to claim 3 wherein B is incorporated therein so as to have the relationship of $0.07 \leq B_2O_3/N \leq 0.75$ (ratio by weight) with the pseudo-brookite complex oxide (N) and the relationship of $0.015 \leq B/Fe \leq 0.05$ with Fe.

7. A titanium-iron complex oxide pigment according to claim 3 wherein Si is incorporated therein so as to have the relationship of $0.59 \leq SiO_2/N \leq 4.90$ (ratio by weight) with the pseudo-brookite complex oxide (N) and the relationship of $0.024 \leq Si/Fe \leq 0.125$ with Fe.

8. A titanium-iron complex oxide pigment according to claim 3 wherein Ca is incorporated therein so as to have the relationship of $0.55 \leq CaO/N \leq 4.50$ (ratio by weight) with the pseudo-brookite complex oxide (N) and the relationship of $0.026 \leq Ca/Fe \leq 0.13$ with Fe.

* * * * *